Oct. 25, 1960  D. FERRARO  2,957,722
WEEDING TOOL
Filed May 4, 1959

INVENTOR
Dominick Ferraro.
BY
ATTORNEY

United States Patent Office 2,957,722
Patented Oct. 25, 1960

2,957,722

WEEDING TOOL

Dominick Ferraro, 662 Bush St., Bridgeport, Pa.

Filed May 4, 1959, Ser. No. 810,730

1 Claim. (Cl. 294—50.8)

The present invention relates to a weeding tool.

As is well known, it has long been the practice to eradicate weeds from gardens or lawns by pulling same from the ground whereby the roots as well as the bodies of the weeds are removed which is far superior to the cutting of the weeds above the ground and leaving the roots for regrowth of the weeds.

Weeding operations are usually carried out by persons who walk along the ground and stoop over for removing weeds by their hands, particularly when the weeds are not excessively numerous as is often the case in gardens and lawns.

There are, however, many persons who, due to physical defects, are unable to stoop over and who can remove weeds only upon sitting on the ground or creeping over same on their knees.

It is accordingly a primary object of the present invention to provide a weeding tool whereby weeds may readily be removed from the ground in gardens and lawns by persons in erect stature and without the necessity of a stooping posture.

A further and more specific object of the invention is to provide a weeding tool which is relatively simple in construction, highly efficient in operation, and which is capable of manufacture at relatively low cost.

Other objects and advantages of the invention will become apparent in the course of the following detailed description, taken in connection with the accompanying drawings, wherein.

Figure 1:
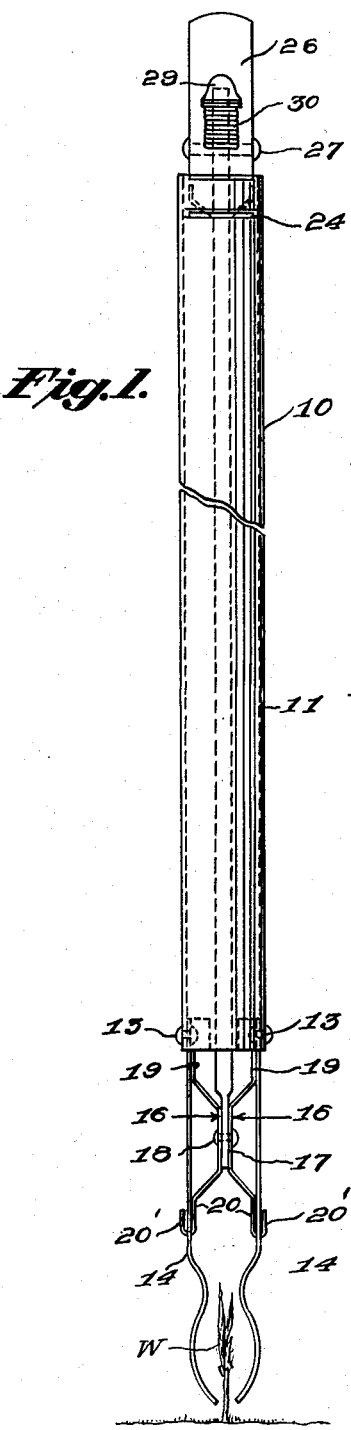
Fig. 1 is a broken elevational view of the improved weeding tool in accordance with a preferred structural embodiment thereof.
Figure 3:
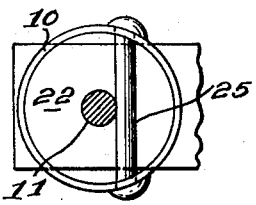
Fig. 3 is an enlarged transverse sectional view as observed in the plane of line 3—3 on Fig. 2.

Referring now in detail to the drawing, the improved tool will be seen to comprise an elongated cylinder 10 within which is axially disposed a rod 11 whose opposite ends project from opposite ends of the cylinder.

Figure 2:
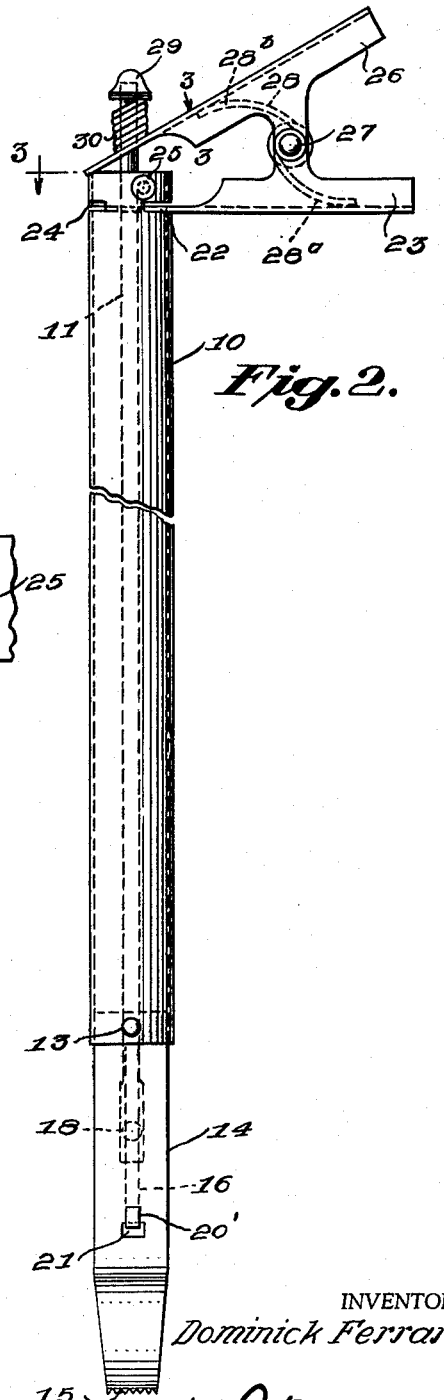
Fig. 2 is a broken elevational view of the improved tool as observed at right angles to Fig. 1.

Secured to the lower end of the cylinder as by means of rivets 13 are the upper ends of laterally opposed resilient arms 14 which as is indicated in Fig. 1 are of dual curve formation adjacent their lower ends and the free ends of the arms are serrated as indicated at 15 in Fig. 2 for more effective grasp of weeds.

A pair of straps 16 have opposing parallel portions 17 thereof secured to the lower end of the rod 11 as by means of a rivet 18.

The straps 16 further include upper portions 19 which freely engage the inner faces of arms 14 and corresponding lower portions 20 of the straps terminate in upwardly opening hooks 20' whose bight portions engage the upper edges of openings 21 in the arms 14.

The upper end of rod 11 extends through an opening in a plate portion 22 of a bracket 23 which is of U-formation externally of the cylinder 10 as is clearly indicated in Fig. 2.

The plate portion 22 is partially disposed within a transverse slot 24 in the cylinder 10 and a rivet 25 extends through the wall of cylinder 10 above the plate portion 22 which engages the rod 11.

An inverted U-form handle 26 is pivotally connected to bracket 23 as at 27 and a coiled leaf spring 28 surrounds pivot 27 and includes arms 28ᵃ and 28ᵇ which respectively engage bracket 23 and handle 26.

The upper end of rod 11 extends through the handle 26 and whose upper end is provided with a nut 29 between which and handle 26 is disposed a cushioning coil spring 30.

As is indicated in Fig. 1, the free serrated ends of arms 14 are normally spaced for reception of a weed or weeds therebetween. Upon actuation of handle 26, rod 11 will be drawn upwardly whereupon straps 16 will cause the resilient arms 14 to move toward each other with a resulting gripping action of the free ends of the arms with the weed or weeds.

Upon release of the handle, the arms 14 will automatically separate with a resulting release of the weed or weeds.

Having set forth the invention in accordance with a preferred structural embodiment thereof, what is claimed and desired to be secured by U.S. Letters Patent is:

A weeding tool comprising an elongated open ended tubular cylinder, a bracket affixed to one end of said cylinder, a handle having an opening therein pivotally secured to said bracket with the opening overlying one open end of said cylinder, an elongated rod extending concentrically through said cylinder and through said opening in said handle, a head on the end of said rod beyond said handle, a spring disposed between said head and said handle normally biasing said rout outwardly of said tubular cylinder, a second spring surrounding the pivotal connection of said handle to said bracket biasing the end of said handle having said opening therein away from said bracket, a pair of laterally opposed resilient arms having openings therein and having their free ends serrated to form weed grasping members secured at their other ends to the end of said cylinder opposite said handle, a pair of straps disposed on the inner sides of said arms, means securing the mid points of said straps to the end of said rod adjacent said arms, the end portions of said straps extending along said arms in aligned relation therewith, and hook means on the opposite end portions of each of said straps engaging in said openings in said arms whereby movement of said handle to move the adjacent end of said rod outwardly of said cylinder will cause said hooks to draw said arms together and cause clamping engagement of the serrated ends of said arms.

References Cited in the file of this patent

UNITED STATES PATENTS

| | | |
|---|---|---|
| 296,550 | Foster | Apr. 8, 1884 |
| 774,142 | Brick | Nov. 1, 1904 |
| 1,220,899 | Sorensen | Mar. 27, 1917 |
| 1,239,201 | Mac Lachlan | Sept. 4, 1917 |
| 1,855,477 | Emery | Apr. 26, 1932 |
| 1,959,617 | Dragovich | May 22, 1934 |
| 2,852,302 | Steffen | Sept. 16, 1958 |
| 2,855,668 | Ottenad et al. | Oct. 14, 1958 |